Oct. 10, 1933.  J. J. CURLEY  1,930,193
VEHICLE DIRECTION INDICATOR
Filed Aug. 22, 1929   2 Sheets-Sheet 1
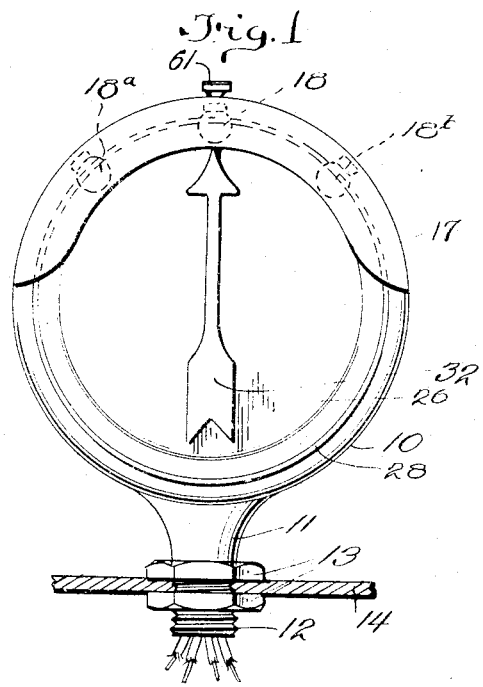
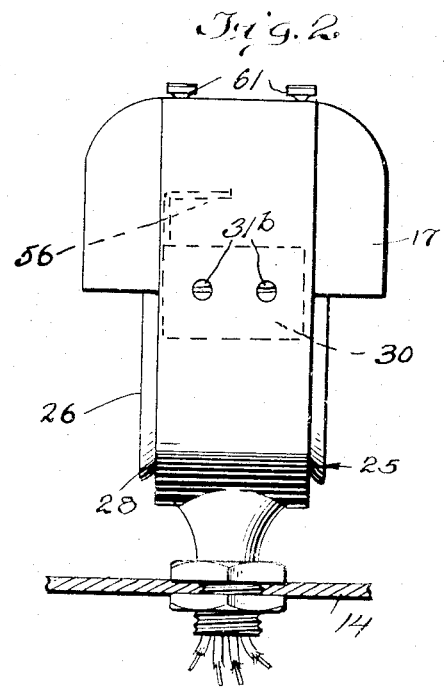
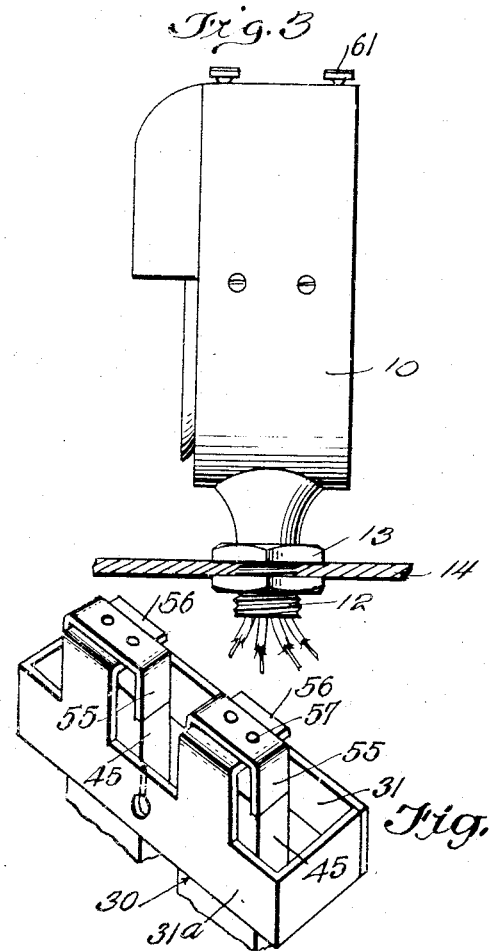
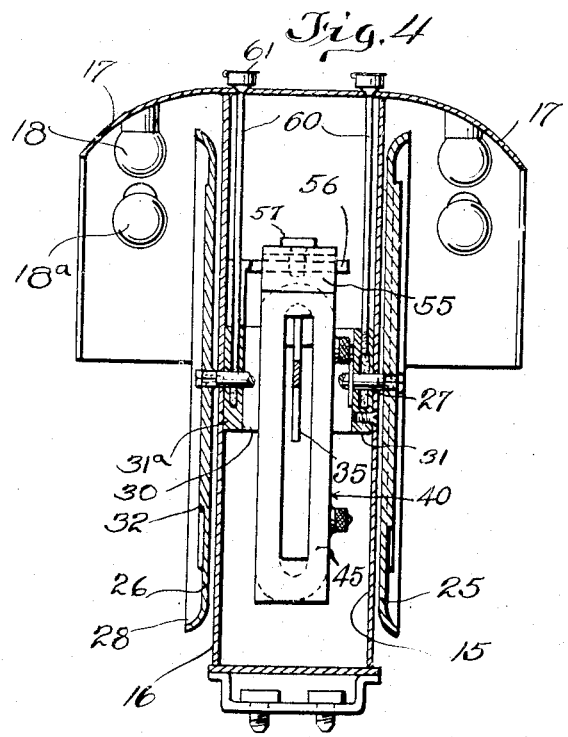
INVENTOR.
J. J. Curley Oct. 10, 1933.  J. J. CURLEY  1,930,193
VEHICLE DIRECTION INDICATOR
Filed Aug. 22, 1929  2 Sheets-Sheet 2

INVENTOR.
J. J. Curley
BY
Blair & Kilgore
ATTORNEYS

Patented Oct. 10, 1933

1,930,193

UNITED STATES PATENT OFFICE 1,930,193

VEHICLE DIRECTION INDICATOR

John J. Curley, Brockton, Mass.

Application August 22, 1929. Serial No. 387,690

10 Claims. (Cl. 177—327)

This invention relates to apparatus for indicating an intended change of course or direction of travel, and while it has special application to automobile direction indication, the apparatus is not limited thereto as it may be practically used in other applications.

An object of the invention is to provide an improved device which is operable at the will of the driver to indicate an intended turn or change of course. A further object is to provide an electrically operated device of the above character, which is certain and efficient in operation, while of a simplified construction. A further object is to provide a direction indicator incorporating magnetizing coils which actuate an indicator element, of which the coils are readily removable and replaceable, thus to facilitate repair and/or replacement of such parts. A further object is to provide a device of the above character which is so constructed and arranged as to minimize the possibility of defective operation under adverse weather conditions.

Other objects will be in part obvious from the annexed drawings and in part indicated from the following analysis of the invention, in which reference is made to the accompanying drawings illustrating one embodiment of my idea.

In the drawings—

Fig. 1 is a front elevation of the casing and associated indicator disc forming a part of the invention;

Fig. 2 is a side elevation of the casing structure as shown in Fig. 1;

Fig. 3 is a side elevation of a modified form of casing;

Fig. 4 is a partial section taken thru Fig. 2 to illustrate the indicator operating parts;

Fig. 4a is a detail in perspective illustrating the mounting of the coils within the casing;

Figure 5:
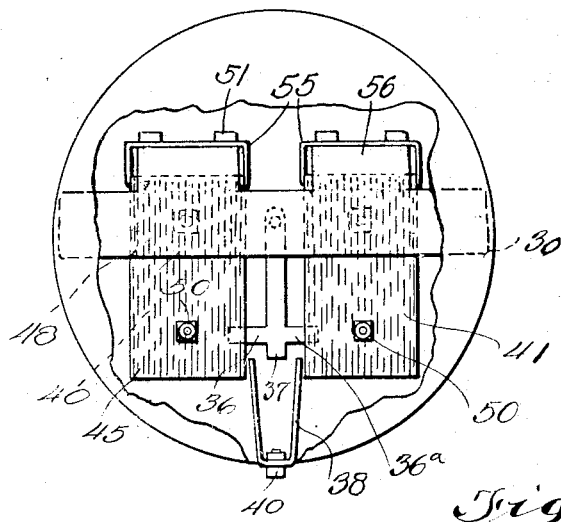
Fig. 5 is a front elevation thru the casing with the indicator plate removed therefrom to show the arrangement of magnetizing coils and armature.
Figure 6:
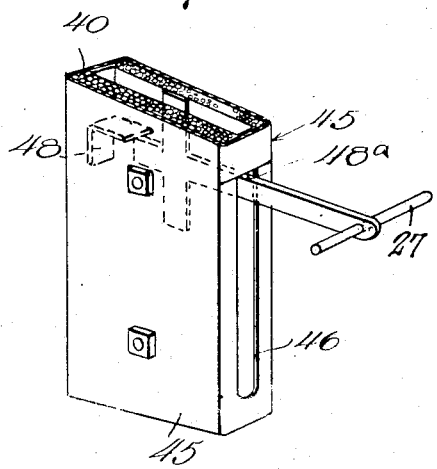
Fig. 6 is a detail section along line 6—6 of Fig. 5 with the armature in raised position.

Referring to the drawings, the reference character 10 designates an open casing shell, which in the form illustrated, is substantially cylindrical or annular, but may be of any preferred shape, and mounted on a post 11 which has a threaded end 12 provided with locking nuts 13. The locking nut arrangement illustrated is a suggested form of attachment of the casing 10 to a part of the vehicle such as fender 14, and recourse may be had to any other desired mode of attachment.

The shell 10, shown in Fig. 4, is closed by a front wall 15 in the form of a circular plate and a similarly arranged rear wall 16. The upper front and rear portions of the casing are preferably extended as at 17 to provide a projecting cowl in which lamps 18, 18a, 18b are mounted for the purpose hereinafter to be described, and as indicated in Fig. 1, the cowl extends throughout a substantial arc of the casing. In the alternative construction of Fig. 3, the cowl 17 is provided on the relatively rear of the casing only, and the front wall 15 of the casing is extended upwardly to meet the top circular wall thereof.

In the construction of Fig. 4, I provide front and rear indicator discs 25, 26 which are preferably circular in conformation, and which are removably fixed on an axle 27, preferably of brass or other non-magnetic material, and extending thru the front and rear walls 15, 16 of the housing 10. The discs project along their upper periphery into the cowl 17, and may be slightly flanged as at 28 thereby to expeditiously shed water or rain therefrom.

The discs 25, 26, are preferably of aluminum, painted white, and carry an impressed direction arrow 32 thereon, which may be painted red or other suitable color. In its neutral position, the arrow may point upwardly, but as the discs are turned, the direction arrows point in the direction of such turn.

Bearings for the axle 27 are provided in a substantially rectangular frame member 30, of which one side 31 is removable from the remaining U-shaped portion 31a, which extends within and across the casing 10. The side legs of the member 31a are suitably fastened as by securing screws 31b to the shell 10, and one plate 16 is thereafter secured to the cross portion of the member 31a. Upon securing the side 31 to the ends of the side legs of frame member 31a, the remaining plate 15 may be secured thereto. Such an arrangement permits said plate 15 to be removed, and the side 31 to be disassembled from the frame portion 31a, thus to permit access to the mechanism housed in the casing 10.

The said axle 27 carries a soft iron, free moving armature 35 provided with sidewardly extending legs 36, 36a, and a downwardly extending portion 37. It will be understood that the axle 27 and armature 35 have a neutral position, in which it is normally maintained by a permanent magnet 38 (Fig. 5), which extends thru the casing 10 and is secured on the exterior thereof by suitable fastening means 40. The magnet 38 preferably comprises a U-shaped magnetized member, between the legs of which the portion 37 of the armature 35 is adapted to be equally disposed.

The side portions 36, 36a of the armature are arranged to extend into the specially shaped coil magnets 40, 41 made up of a plurality of copper or other suitable wire wound in coil formation, and suitable for the voltage of the usual automobile battery. The said coils are in the form of an elongated open loop having a central hollow core. Each of the coils 40 and 41, after winding, is sheathed or jacketed in a cover or sheath 45 of magnetic material such as soft iron, which completely encloses the coil magnets excepting throughout the slots 46 disposed on the opposed faces of the said jackets. This arrangement of jacket produces a strong magnetic field surrounding the coils. Terminals 50, for the coils 40, 41, extend thru the jackets 45 for connection with a wiring system. Disposed on the outer end faces of the sheaths 45 and extending into the hollow cores of the coils, are L-shaped stops 48, of soft iron. The portion 37 of the armature 35 engages the said stops, as well as making contact at the end 48a of the slot 46 to make a closed magnetic circuit thru the armature and jacket.

The jackets 45 having secured thereto or integrally formed therewith adjacent their top portions the straps 55, which are suitably spaced from the jacket 45 and the coils sheathed thereby to permit entry of bracket members 56 (Fig. 4) extending upwardly and inwardly from the frame 30 into the spaces so formed. For convenience of manufacture, the brackets may be formed integrally with said frame 30. Securing screws 57 are provided to project thru the straps 55 and function to hold the magnet coils in operative position relative to the armature 35.

The axle bearings in frame 30 may be suitably lubricated as by means of tubes 60 provided with cap closures 61 opening thru the top casing 10 so as to be accessible from the exterior thereof.

In operation, it will be understood that as either coil 40, 41 is energized, the armature 35 is pulled from its neutral position and caused to turn about the axis of the axle 27 until it engages the soft iron projection 48 extending from the jackets 45, thus completing a magnetic circuit thru the core of the magnet. Turning of the axle 27 causes the discs 25, 26 to be rotated, and the impressed arrow suitably indicates the direction of turn or the change of course. Upon de-energization of the magnet coils, the armature 35 is caused to assume its neutral position due to the pull of the permanent magnet 38. It is desirable that the poles of the magnet 38 agree with the polarity of the magnet coils 40, 41, so that the effect of magnet 38 will not be weakened. The said magnet has the added function of preventing the armature 35 from swinging when the car is in motion.

Figure 7:
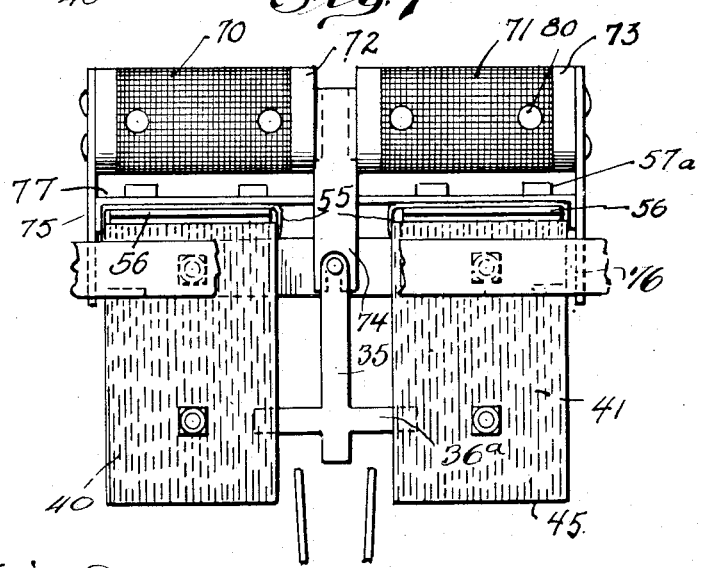
Fig. 7 is a modified form of magnet arrangement, illustrated as looking into the rear of the casing.

In the modified construction of Fig. 7, I have illustrated a booster magnet arrangement, in which booster coils 70, 71 are wound on soft iron cores 72, 73, respectively, arranged in tandem, and mounted between a common pole piece 74 and end pole pieces 75, 76, the lower portions of which extend downwardly and are suitably joined to jacket 45 of the loop coils 40, 41. The core members 72, 73 extend parallel to the axis of the hollow cores of said coils 40, 41, thus being disposed horizontally in the construction illustrated, and are of course in close proximity to said coils 40, 41. A brass or other non-magnetic strap 77 extends between said end pieces 75, 76, and is secured to bracket 56 as above described as by fastening screws 57a extending therebetween. Terminals 80 connect with a source of voltage, and the said coils 70, 71 may be connected in series or in parallel with the loop coils 40, 41. It is to be noted that the center pole 74, which has its end slotted, comes in close contact with the armature 35, making said armature a pole opposite in polarity to the stops 48 engaged by the armature during actuation. The booster coils 70, 71 thus act to aid the loop coils 40, 41 to pull the armature 35 to its raised position. Preferably the jacket 45 is not extended to cover the booster coils.

The construction above described has the advantage that the coils 40, 41 and booster coils 70, 71 may be readily withdrawn independently or together from the casing 10 for repair or replacement purposes.

The direction indicator as above described is adapted to be arranged on the front and rear of the car, thus to indicate to both front and rear traffic an intended turn or change of direction. The indicator as used in the front of the car would advantageously be of the construction shown in Figs. 2 and 4, wherein front and rear indicator discs 25, 26 are provided, the rear disc indicating to the driver of the vehicle that the device is correctly operating. The rear indicator unit would preferably comprise the type of casing shown in Fig. 3 wherein the indicator disc 25 would be disposed at the rear to thus indicate intended change of direction to rear traffic.

Figure 8:
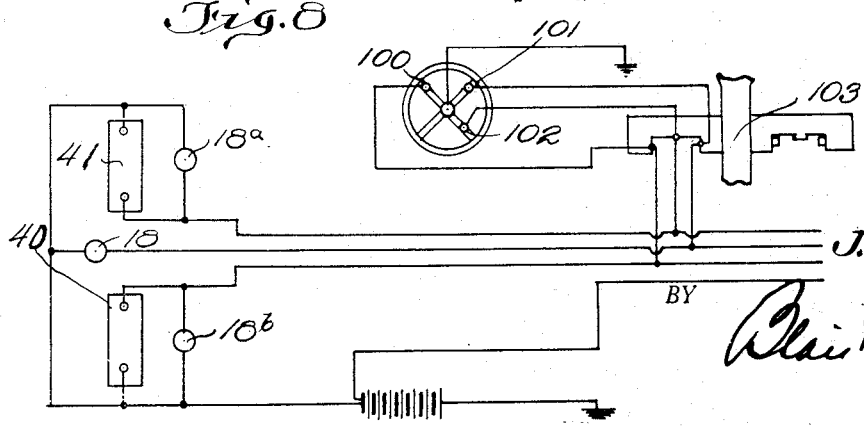
Fig. 8 is a schematic illustration of the suggested electrical circuits.

In Fig. 8, I have illustrated a suggested arrangement of wiring and switch control including the button switches 100, 101, 102, on the driving wheel connected thru a rotary connector unit 103, such as described in my prior patent, No. 1,712,295, to the loop coils 40, 41 and booster coils when utilized, with a battery. Upon pressing button 100, one magnet coil 40 is energized to pivot the armature and thus cause arcuate travel of the indicator plates. The light 18b connected in parallel with the coil 40 is illuminated to direct light on the turned indicator discs and shows clearly the arrow in its turned position. Similarly, as the switch button 101 is actuated, the magnet 41 is energized to cause the armature 35 and indicator discs 25 and 26 to be turned in the reverse direction and its corresponding light 18a to be illuminated. When it is desired to signal to front and rear traffic that a straight-ahead direction will be followed, the button 102 is actuated, closing circuits thru light 18 which illuminates the arrow but does not produce motion thereof. The inside surface of the cowl 17 may be formed as a reflector surface to aid in directing the light rays on to the arrow.

Without further analysis of this invention, the foregoing will so fully reveal the gist thereof that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

I claim:

1. In a direction indicator, the combination of an open shell, a frame member secured interiorly of said shell, end plates secured to the frame and constituting closures for the shell, the shell and end plates forming a casing, an axle having bearings in said frame and extending thru the end plates, indicia means carried by said axle exterior of the casing, an armature fixed on said axle within the casing, magnetizing coils disposed laterally of said armature and in which portions of said armature are adapted to pass, sheaths of magnetic material substantially enclosing the coils, the sheaths being each provided with an opening through which the armature may be actuated, the sheaths being provided with straps, and brackets extending from said frame in operative relation to said straps to suspend the coils therefrom, one end plate and a portion of the frame being bemovable from the casing, whereby the coils may be placed on and removed from the brackets.

2. In a direction indicator, the combination of a casing comprising an open shell having a cowl extending therefrom and front and rear plates forming a closure for the shell, an axle extending thru a plate, indicia means having indicia means thereon and carried by the axle and disposed exteriorly of the casing and extending into said cowl, lamps disposed in said cowl to illuminate the indicia means, electrical means in said casing to cause rotation of said axle from a neutral position, one of said lamps being operative to illuminate the indicia means when the latter is in such neutral position, and the other lamps being operative to illuminate the disc upon actuation of the disc from such neutral position.

3. In a direction indicator, the combination of a casing, an axle extending therethru, indicia means carried by said axle, an armature fixed on said axle, magnetizing coils disposed laterally of the armature for actuating the armature and axle, sheaths of magnetic material substantially enclosing the coils and each provided with an opening through which the armature may be actuated, the sheaths being provided with straps, and means extending from one side of the casing to engage the straps and suspend the coils therefrom, the other side of the casing being removable, thereby permitting access to the coils therein.

4. In a direction indicator, the combination of a casing, an anxle extending therethru, indicia means carried by said axle, an armature fixed on said axle, magnetizing coils, means for mounting the coils in the casing laterally of the armature, means for energizing a coil, thereby to actuate the armature and axle, and sheaths of magnetic material substantially enclosing the coils and each provided with an opening thru which the armature may be actuated, said armature during actuation being operative to complete a magnetic circuit through said sheaths.

5. In a direction indicator, the combination of a casing, an axle extending therethru, indicia means carried by said axle, an armature fixed on said axle, magnetizing coils, means for mounting the coils in said casing laterally of the armature, means for energizing a coil, thereby to actuate the armature and axle, and sheaths of magnetic material substantially enclosing the coils and each provided with an opening thru which the armature may be actuated, the sheath being provided with armature stops, said armature being mounted to engage the stops during actuation thereof and operative, when so engaged, to complete a magnetic circuit through the sheaths.

6. In a direction indicator, a casing, an axle extending therethru, indicia means carried by said axle, an armature fixed on said axle, magnetizing coils disposed laterally of the armature for actuating the same, sheaths of magnetic material substantially enclosing the coils and each provided with an opening thru which the armature may be actuated, the sheaths being provided with straps, and brackets fixed with respect to said casing in operative relation to said straps to suspend the coils therefrom, said armature during actuation being operative to complete a magnetic circuit through said sheaths.

7. In a direction indicator, a casing, an axle extending therethrough, indicia means carried by said axle, an armature fixed on said axle, magnetizing coils having a hollow core, means for mounting said coils in said casing laterally of the armature, means to energize one of said coils whereby to actuate the armature into the core thereof, core members arranged in proximity to the coils and disposed in substantially horizontal position above the coils, magnetic means extending between the coils and core members for supporting the core members, and booster coils disposed about said core members and electrically connected to and operative to increase the magnetic fields of the first coils.

8. In a direction indicator, a casing, an axle extending therethrough, indicia means carried by said axle, an armature fixed to said axle, magnetizing coils each having a hollow core, means for mounting said coils in said casing laterally of the armature, means to energize the coils, the armature being adapted for movement into the hollow cores upon energization of the respective coils, sheaths of magnetic material substantially enclosing the coils, the sheaths being provided with apertures in alignment with said hollow cores and through which the armature is actuated, pole pieces extending upwardly from the sheaths, core members supported by said pole pieces in proximity to said coils and in substantially horizontal position, and booster coils disposed about said core members and electrically connected to said first coils, said booster coils being operative to increase the magnetic field of said first-named coils.

9. In a direction indicator, a casing, an axle extending therethrough, indicia means carried by said axle, an armature fixed to said axle, magnetizing coils having hollow core portions, means for mounting said coils in said casing laterally of the armature, means to energize one of said coils whereby to actuate the armature into the core thereof, horizontally extending core members disposed above the coils in tandem relation, magnetic means supporting said core members from said coils and in proximity thereto, and booster coils disposed about said cores and electrically connected to and operative to increase the magnetic fields of the first coils.

10. In a direction indicator, a casing, an axle extending therein, indicia means carried by said axle, an armature fixed on said axle, a U-bar magnet having its legs extending into the casing and adapted to maintain the armature in neutral position, means for detachably securing the magnet to the casing exteriorly thereof, magnetizing coils, means for mounting said coils in said casing laterally of said armature, means for energizing the coils, said coils each having a hollow core portion into which the armature moves upon energization of a coil, the legs of the magnet extending between the coils and terminating below said armature, the magnet being poled to agree with the polarity of the coils.

JOHN J. CURLEY.